United States Patent
Rogers et al.

(10) Patent No.: US 7,330,838 B2
(45) Date of Patent: Feb. 12, 2008

(54) SYSTEM AND METHOD FOR SECURING TRANSACTIONAL DATA TRANSMITTED OVER A WIRELESS NETWORK IN A RETAIL STORE ENVIRONMENT

(75) Inventors: Ron W. Rogers, Suwanee, GA (US); Stephen J. Chasko, Flowery Branch, GA (US)

(73) Assignee: NCR Corporation, Dayton, OH (US)

( * ) Notice: Subject to any disclaimer, the term of this patent is extended or adjusted under 35 U.S.C. 154(b) by 1254 days.

(21) Appl. No.: 10/035,464

(22) Filed: Dec. 31, 2001

(65) Prior Publication Data

US 2003/0126091 A1 Jul. 3, 2003

(51) Int. Cl.
*H04K 1/00* (2006.01)
*H04L 9/00* (2006.01)

(52) U.S. Cl. .............................. 705/64; 705/50; 705/51

(58) Field of Classification Search .................... 705/1, 705/50, 51, 64
See application file for complete search history.

(56) References Cited

U.S. PATENT DOCUMENTS 4,262,359 A * 4/1981 Cory et al. ................. 380/267
5,086,467 A * 2/1992 Malek ......................... 380/252
6,502,135 B1 * 12/2002 Munger et al. ............. 709/225

FOREIGN PATENT DOCUMENTS

GB 2248535 A * 4/1992

WO WO 00/46959 8/2000

OTHER PUBLICATIONS

"Caught in the honeypot", Brett Glass, Boardwatch, Jan. 2000, v14, Issue 1, p. 114.*

(Continued)

*Primary Examiner*—Calvin Loyd Hewitt, II
(74) *Attorney, Agent, or Firm*—Maginot, Moore & Beck, LLP

(57) ABSTRACT

A system and method secure transactional data communicated over a wireless network in a store by obfuscating bona fide transactional messages in the message traffic flow. The system includes a load balancer coupled to a store host computer and a plurality of transactional terminals coupled to the store host computer through a wireless communication network. The load balancer monitors message traffic queues and message processing at the store host computer to determine possible dead time in the bandwidth of the wireless communication network. If the dead time is greater than a threshold, a bogus request message is generated and sent to one or more terminals in the system. In response to receipt of a bogus request message, a terminal activates a bogus message generator. The bogus message generator generates transactional messages with bogus customer, account, and transactional data therein. The generated messages are transmitted to the store host computer until a bogus message timer expires or a bona fide transaction commences at the terminal where the bogus message generator has been activated. To further frustrate would be eavesdroppers, the bogus and bona fide transactional messages are encrypted to increase processing time for the messages by eavesdroppers. The increased message traffic volume camouflages the true communication parameters of the network and makes analysis of the traffic flow by eavesdroppers more difficult.

3 Claims, 3 Drawing Sheets

OTHER PUBLICATIONS

Rackoff et al., "Cryptographic Defense Against Traffic Analysis", Proceedings of the Twenty-Fifth Annual ACM Symposium on Theory of Computing, 1993, pp. 672-681, XP009008547.

Park et al., "Token-Based Security Protocol for Wireless Local Area Networks", Citeseer, Scientific Literature Digital Library, Sep. 1997, pp. 1-13, XP001146767.

Cooper et al., "The Design and Implementation of a Private Message Service for Mobile Computers", Wireless Networks, The ACM Digital Library, Oct. 1995, pp. 297-309, XP000538242.

* cited by examiner

ND METHOD FOR SECURING
SYSTEM AND METHOD FOR SECURING TRANSACTIONAL DATA TRANSMITTED OVER A WIRELESS NETWORK IN A RETAIL STORE ENVIRONMENT

FIELD OF THE INVENTION

This invention relates generally to methods and systems for implementing financial transactions in a retail store and, more particularly, to methods and systems for implementing financial transactions in a retail store through a store host network.

BACKGROUND OF THE INVENTION

Financial transactions systems are typically used to provide a consumer with access to funds for a purchase of some sort. Many financial transaction systems are token based as they require the consumer to submit a token, usually in the form of a credit, debit, or smart card, that identifies a financial account associated with the consumer. A terminal associates the financial account data and the customer data stored in the token with transaction data to generate a transaction message. In a retail store having a plurality of terminals for processing transactions at a checkout counter or the like, the transaction message is typically transmitted through a communication network to a host computer that is typically located on the store's premises. The host verifies the content of the message and then forwards the message contents to a transactional processing system that validates the association of the account with the customer data and generates an authorization message for the transaction. The authorization message is returned to the host and the host notifies the terminal at the checkout counter that an authorization message has been received so the transaction approval may be presented to the consumer. The consumer may then acknowledge the transaction approval and receive the goods or services.

The communication network that couples the terminals at the checkout stations to the store host is typically comprised of communication cables, cable interface units, routers, amplifiers, or other known hardware devices and computer programs for operating the computer communication network. Thus, when checkout stations are moved or the store layout changed, the cables and other network components require moving as well. Sometimes communication cables and other communication components are damaged or their operational characteristics are degraded by movement. Consequently, additional time is needed for testing and verifying the operation of the computer communication network following movement of the network components.

In an effort to avoid the problems of maintenance and infrastructure associated with network communication components, stores are increasingly using wireless communication systems and methods for communicating messages between terminals at checkout stations and the store host. Such networks do not require many of the components of a wired communication network, especially the cables. While the routing and maintenance of communication cables may be frustrating or expensive, they do provide secure communication links because the cables are usually located where visitors to the store are unlikely to be able to access them. Also, because they provide point to point communication paths, they cannot be easily interrupted for access to the datastreams that are transmitted through them. Wireless networks, on the other hand, do not require expensive cable layouts, maintenance, and verification. Consequently, they allow the checkout stations to be more mobile because they are not coupled to cables that need to be rerouted after moving a station. The terminals in wireless communication systems typically include a low power transmitter and receiver. The store host also includes a transmitter and receiver or a transceiver that performs both functions for communication with the terminals at the stations.

While the wireless networks do not require the infrastructure that cable communication systems require, they do present additional security risks because they broadcast through the air space of a store. These transmissions are available to anyone having a receiver with an appropriate antenna that is tuned to the proper frequency for message reception. Additionally, the transmissions may penetrate the walls of a store facility and become available for reception at locations outside the premises of the store. The susceptibility to eavesdropping presents at least two problems for wireless communication in retail stores. One problem is the possibility that transaction messages are intercepted for the purposes of gleaning transactional data such as account and customer data for the unauthorized manufacture of bogus identification and financial tokens. Another problem of wireless transmission susceptibility to interception is the use of the data in such messages by industrial espionage agents. Although encryption techniques may be used to frustrate the use of the data content of the transactional messages, industrial espionage may still gain insight into the operations of a competitor by analyzing transactional message traffic flow. For example, by detecting regular periods of consumer activity at the store, a competitor may time sales to lure the store's customers to its facility instead. In the past such information could be obtained by having industrial espionage agents present in a store to observe consumer activity and the like. However, the expense of having such personnel limited the size of a competitor's espionage force. Because the agents can only be at one place at a time, there was some limit on the amount of espionage that a competitor could conduct in this manner. However, the interception of transactional data, including traffic flow patterns, may be obtained from low cost receivers with recording media units. These receivers may be located and left in the vicinity of a store and later retrieved for recovery of the data stored on the recorded media. Such units may even be located on the store's premises in hard to discover places such as above ceiling tiles in a bathroom or other rarely observed locations. If the units are provided with a transmitter, they could be used to collect data and transmit it to an espionage data processing sight at times when the store is deserted to avoid detection from operation of the unit.

Consequently, what is needed is a way of frustrating the ability to effectively use transactional data communicated between a store host computer and terminals located in the store over a wireless network.

What is needed is a system that discourages the interception of transactional messages communicated over a wireless network in a retail store.

SUMMARY OF THE INVENTION

The above-noted limitations of previously known systems and methods for communicating transactional data between a store host and terminals located in a store have been overcome by a system and method that operate in accordance with the principles of the present invention. The method of the present invention includes generating bogus transactional messages for transmission over a wireless communication network that is used to communicate data between a store host computer and a terminal located in a store and transmitting the bogus transactional messages during dead space intervals. The communication parameters are measured during a communication interval and are used to determine the communication load of the store host computer. Terminals not being fully utilized may then be controlled to generate one or more bogus messages and transmit them. The host computer discards the bogus messages so they do not impose a significant processing load for the computer. The generation of bogus messages at a terminal may be interrupted for a bona fide transaction occurring at the terminal. The interrupted generation of a bogus transaction message may then be resumed after completion of the bona fide transaction provided the transmission of the bogus message does not overbalance the communication load on the host computer.

The method may be implemented with a system made in accordance with the principles of the present invention. The system includes a bogus message generator coupled to a wireless terminal in a store and a communication parameter regulator for measuring a communication load on a store host computer. The communication parameter regulator preferably measures the communication load on a store host computer during a communication interval and determines the amount of dead space available for other communication messages. This data is then used to send bogus generation control messages to the wireless terminals in a store. These messages are processed by the terminals to determine appropriate times for the generation and transmission of bogus messages to the store host computer. The store host computer discards the bogus messages upon receipt and identification of the messages as being bogus messages.

The method and system of the present invention increases the message traffic through a wireless communication system in a store. The bogus message traffic camouflages the bona fide transactional message traffic flow so the usefulness of the data that may be gleaned from analyzing transactional data flow is degraded. Additionally, those persons eavesdropping on the store wireless communication traffic to obtain data for generating identification and financial transaction tokens are probably unable to distinguish valid transaction messages from bogus messages. Consequently, the interception of data messages from a wireless system incorporating the system and method of the present invention is rendered less profitable and useful for the manufacture of counterfeit tokens.

It is an object of the present invention to frustrate accurate analysis of the wireless communication traffic flow in a store by those intercepting communications occurring over a wireless network.

It is an object of the present invention to make detection of valid transactional messages intercepted from a wireless communication system difficult.

These and other advantages and features of the present invention may be discerned from reviewing the accompanying drawings and the detailed description of the invention.

BRIEF DESCRIPTION OF THE DRAWINGS

The present invention may take form in various system and method components and arrangement of system and method components. The drawings are only for purposes of illustrating an exemplary embodiment and are not to be construed as limiting the invention.

DETAILED DESCRIPTION OF THE INVENTION

Figure 1:
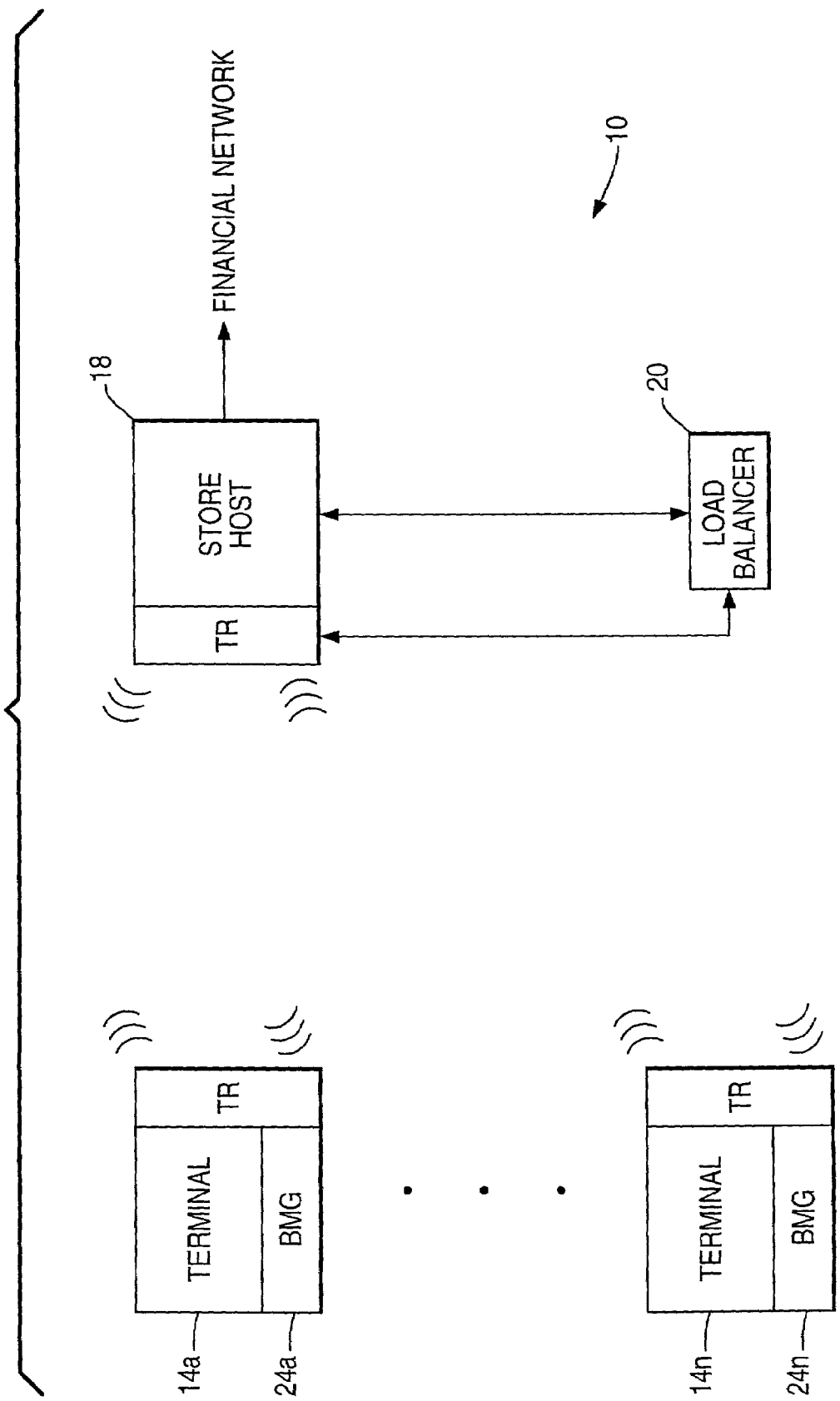
FIG. 1 depicts a block diagram of a system that may be used to generate bogus transactional messages in a wireless communication network of a retail store.

A system embodying the present invention is shown in FIG. 1. System 10 may include a plurality of payment terminals 14a-14n, such as credit, debit card, or other financial token readers that are typically located at checkout stations throughout a store or congregated in a checkout area of the store. These terminals include a transceiver or transmitter/receiver combination for wirelessly communicating with store host computer 18. Store host computer 18 acts as a server to terminals 14a-14n. One of the tasks store host computer 18 performs is the processing of financial transaction messages received from a terminal 14 to obtain authorization for billing a customer account associated with a financial or payment token presented by a consumer at a terminal 14. Typically, store host computer 18 verifies the customer and account data against internal databases regarding stolen tokens or unpaid customer balances before sending the data to a payment host through a financial or clearinghouse network. Once the response from the payment host is received, store host computer 18 may store data related to the transaction to update its local database before sending an approval message that indicates whether approval was granted or denied. Store host computer 18 includes a transceiver or transmitter/receiver combination for wirelessly communicating with terminals 14 in the store.

Coupled to store host computer 18 is a communication parameter regulator 20 for monitoring a communication parameter and controlling operation of store host 18 in accordance with the monitored parameters. Preferably, communication parameter 20 is a load balancer 20. Load balancer 20 may be any known load balancing program and it may reside and execute in the memory of load balancer 20 or it may reside and execute in its own computer system that is coupled to store host computer 18. Load balancer 20 is coupled directly or indirectly to the transceiver of store host computer 18 so it may monitor the message traffic between store host computer 18 and the terminals 14a-14n in the store. Load balancer 20 determines the number of messages being received from the terminals during a communication interval of time and computes an estimate of the load on store host computer 18 and the duration of the estimate load. "Load" refers to the volume of message traffic expected from terminals 14a-14n during a communication interval and the estimated time required for processing the messages to generate response messages. Load balancer 20 is coupled to store host computer 18 to obtain data regarding average length of time of processing transaction messages, length of response time for messages sent to the payment host, and other processing parameters of store host computer 18. The other processing parameters include the average size of transactional messages, the average time between transactional messages, and the variance between the determined average time. With this data, load balancer may compute an estimated time for processing pending messages and compute an estimated volume of received messages during the time required for processing the messages to determine whether message volume is exceeding the processing throughput of store host computer 18. The volume of message traffic received from terminals 14a-14n and the communication delays in the message traffic with the payment host affect the processing throughput of store host computer 18. If load balancer 20 determines that the message volume is exceeding the throughput of store host 18 and preventing store host 18 from being able to timely process all messages that store host computer 18 receives, load balancer 20 may alter communication and/or processing parameters in the wireless network.

For example, if load balancer 20 determines that store host 18 is unable to timely process the messages in the input queue of host 18 with the anticipated input traffic volume, load balancer 20 may bring another database online to reduce the response time for database queries. This type of control action typically occurs when host 18 processing is bound by database response time. If load balancer 20 determines that host 18 is not timely processing transactional messages because of time delays in communication with the payment host, load balancer 20 may couple alternative communication networks to store host 18 for payment host communication.

In a system made in accordance with the principles of the present invention, load balancer 20 also determines excess capacity in the communication bandwidth between store host 18 and terminals 14a-14n. This dead space parameter is used to signal store host 18 to send messages to one or more terminals 14a-14n to generate and send bogus messages to store host computer 18. Load balancer 20 can anticipate the amount of processing time associated with the bogus message generation and transmission and compute a number of messages or duration time for bogus message generation. This parameter may be determined from the average time between transactional messages or the like. The overhead associated with bogus message processing at store host 18 is negligible because once store host 18 determines a message is bogus, it discards the message without further processing.

In response to receiving a bogus request message from store host 18, a terminal 14a-14n activates a bogus message generator 24a-24n, respectively. A bogus message generator 24 is a software or firmware module that resides and executes in a terminal. A bogus message generator 24 generates messages that have the same format and length as typical financial transaction messages sent to store host 18 for approval. Load balancer 20 may determine these parameters from its historical analysis of transactional message traffic and include these parameters in the bogus request message for use by bogus message generator 24. Using fixed parameters or parameters received in bogus request message, bogus message generator 24 generates bogus messages having an appropriate length that also include account numbers and customer data that do not correspond to actual account numbers or names. For example, account numbers may include illegal characters, inaccurate payment host identifiers, and nonsensical customer data which may include illegal characters or the like. Additionally, the bogus messages preferably include a bogus message identifier that may be parsed by the store host to quickly determine a message is bogus so the message may be discarded after little processing. After generating a bogus message, bogus message generator 24 sends the bogus message to the transceiver of the terminal in which the bogus message generator is executing so the message may be sent to store host 18. Bogus message generator 24 continues generating bogus messages for transmission until a bogus communication time is exceeded. The bogus communication time may be a parameter of the bogus generation message received from store host 18 or it may be an internally stored default time value. For example, the average time between transactional messages computed by load balancer 20 may be used to define a bogus generation time value for inclusion in a bogus request message. Preferably, bogus message generator 24 also terminates its processing in response to detection of a bona fide transaction occurring at a terminal. In this way, the bogus message generator processing does not negatively impact terminal operation by continuing with bogus message generation when the terminal is required for generation of a bona fide transactional message.

Most preferably, store host 18 includes encryption capability for message communication over the wireless network. The preferred encryption method is a private/public scheme method such as the RSA method. This type of method is preferred because the terminals may not reside in a secure environment so storage of a private key at an unsecured terminal may compromise the private key. Thus, terminals 14a-14n and store host 18 use a public/private key scheme to encrypt and decrypt financial and bogus messages communicated between them. Additionally, each communication session between a terminal and store host 18 requires a session key to further enhance security between the two computers. This level of security not only helps to secure the bona fide transaction messages but it makes analysis of the message traffic more difficult as encryption makes bogus messages and bona fide messages even more indistinguishable. Eavesdroppers are less likely to be able to detect and discard bogus messages from the encrypted wirelessly transmitted messages. For an accurate assessment of network traffic parameters, one would need to intercept all message traffic over the network and filter out the bogus message traffic after decrypting and analyzing all of the messages. Only then could the remaining bona fide messages be analyzed for data trends or the like. Thus, the system of the present invention makes such analysis more difficult and the encryption makes the distinguishing of bona fide messages from bogus messages more difficult and time consuming.

Figure 2:
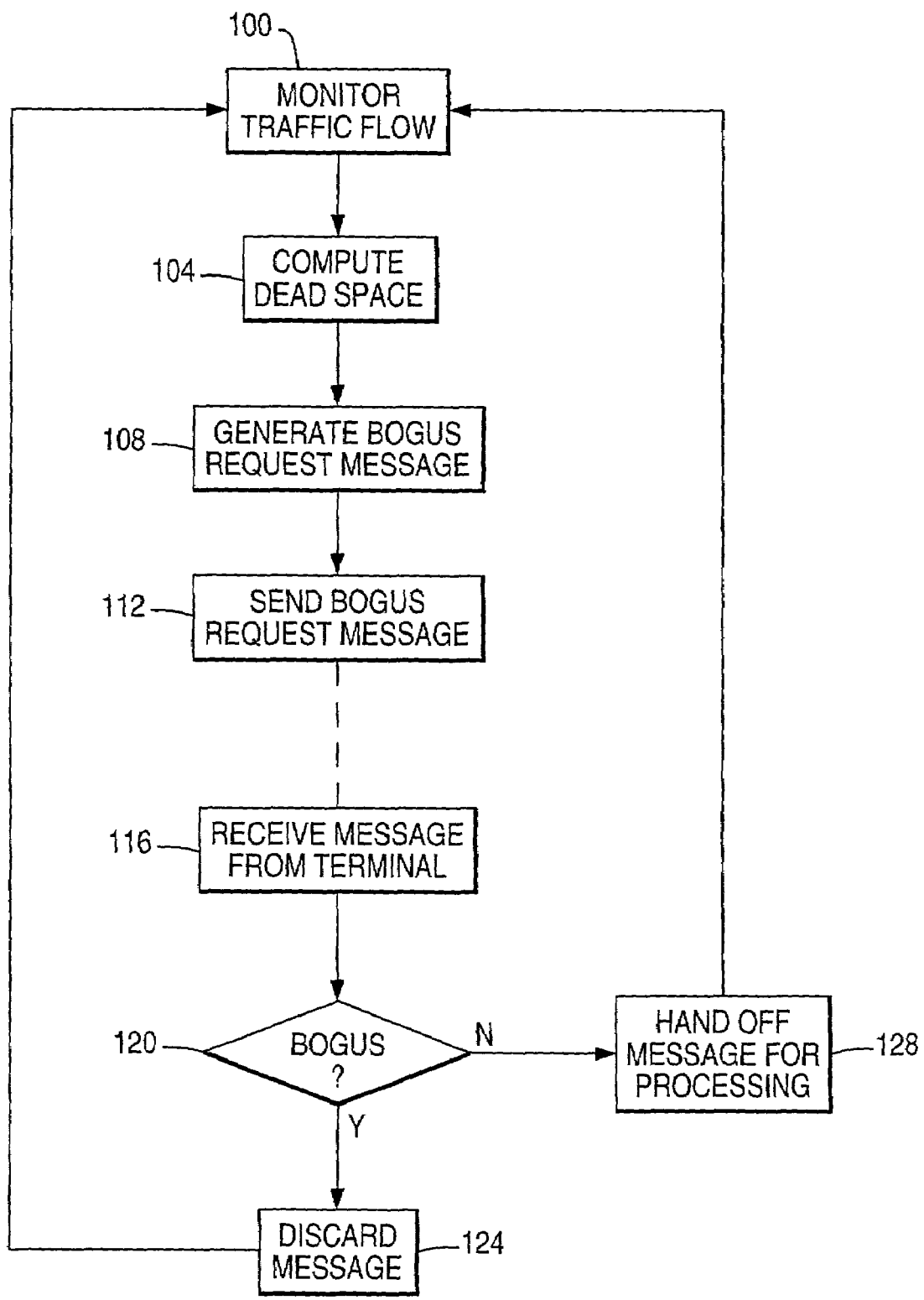
FIG. 2 is a flowchart of an exemplary method for initiating generation and transmission of bogus transactional messages in the system of FIG. 1.
Figure 3:
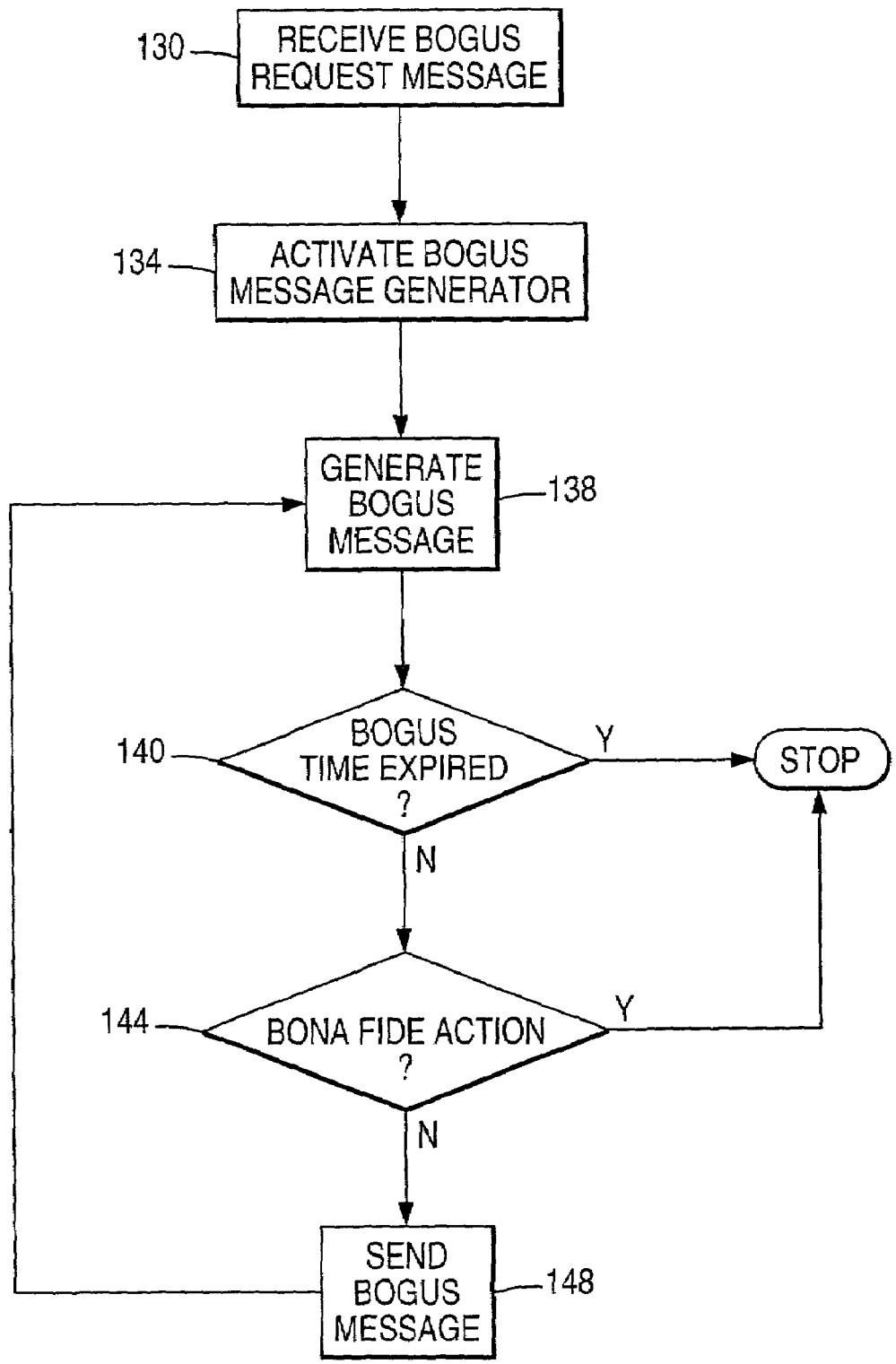
FIG. 3 is a flowchart of an exemplary method for generating and transmitting bogus transaction messages in the system of FIG. 1.

A method for implementing the principles of the present invention is shown in FIGS. 2 and 3. In FIG. 2, load balancer 20 performs the method elements alone or in conjunction with store host computer 18. As load balancer 20 monitors of the load on store host 18 (block 100), it computes the dead space in the communication bandwidth between store host 18 and terminals 14a-14n. If the dead space is zero or below a minimum dead space level, no bogus message generation is performed. If the dead space is above the minimum threshold, a bogus request message is generated (block 108) and sent (block 112). The bogus request message may be sent to a single terminal or it may be sent to a plurality of terminals. As noted above, the bogus request messages may include a bogus time generation value and a bogus message length. The messages may also be encrypted before being transmitted. As bogus messages are received at store host 18 (block 116), they are parsed to determine whether they are bogus messages or not (block 120). The parsing includes decrypting if the messages are encrypted before being sent. If they are bogus messages, they are discarded and the process continues to monitor traffic flow and determine whether sufficient bandwidth for bogus messages is available (block 100). If a received message is not bogus, it is handed to the message processing software (block 128) and monitoring of the traffic flow continues (block 128).

In FIG. 3, a terminal receives and determines whether a message is a bogus request message (block 130). If store host 18 encrypts the messages before sending them, the messages are appropriately decrypted before parsing. In response to a bogus request message, bogus message generator 24 is activated (block 134). If the bogus request message includes a bogus time generation value, then that value is used to set a bogus message timer. If the bogus request message includes a bogus message length, then that parameter is used to generate bogus messages having an appropriate length. Bogus message generator generates a bogus message in accordance with the parameters for bogus message generation (block 138). Bogus message generator 24 continues by determining whether a bogus message timer has expired (block 140) or if the terminal is processing a bona fide transaction (block 144). If the timer has expired or a bona fide transaction is occurring at the terminal, bogus message 24 terminates bogus message generation and terminal processing continues as it typically does without bogus message generation and transmission. If neither event has occurred or is occurring, the bogus message is sent to store host 18 and the process continues generating bogus messages until the bogus message timer expires or a bona fide transaction commences at the terminal. If message encryption occurs in the system, the bogus messages are encrypted before being sent.

While the present invention has been illustrated by the description of exemplary processes, and while the various processes have been described in considerable detail, it is not the intention of the applicant to restrict or in any limit the scope of the appended claims to such detail. Additional advantages and modifications will also readily appear to those skilled in the art. For example, other communication parameters may be measured, such as time between messages, and used by communication parameter regulator 20 to determine when terminals 14a-14n are sent bogus request messages. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A system for securing transactional data transmitted over a wireless network in a store comprising:
   a bonus message generator coupled to a wireless terminal in a store, the bogus message generator for generating bogus messages to be transmitted by the wireless terminal;
   a store host computer for receiving transactional and bogus messages from the wireless terminal; and
   a communication parameter regulator for measuring a communication parameter on the store host computer, the communication parameter regulator operable to activate the bonus message generator so that the bogus message generator is activated in accordance with the measured communication parameter, wherein the communication parameter regulator is a load balancer for measuring dead space in a communication bandwidth between the store host computer and the wireless terminal and wherein the load balancer generates a bogus message request in response to the computed dead space being greater than a threshold.

2. A point-of-sale terminal for communicating transactional messages over a wireless communication network to a store host computer comprising:
   a bogus message generator for generating bogus transactional messages; and
   a transmitter coupled to the bogus message generator for sending the generated bogus transactional messages to a store host computer, wherein the bogus message generator includes a bogus message timer and the bogus message generator generates the bogus transactional messages until the bogus message timer expires.

3. The terminal of claim 2 wherein the bogus message generator sets the bogus message timer in accordance with a bogus time generation value received in a bogus request message.

* * * * *